United States Patent
Kim et al.

(10) Patent No.: US 8,401,060 B2
(45) Date of Patent: Mar. 19, 2013

(54) SYSTEM OF SHARING DATA USING TRANSMISSION ORDER

(75) Inventors: Jae Hoon Kim, Yongin-si (KR); Myeong Wuk Jang, Seoul (KR); Ji Hoon Lee, Anyang-si (KR); Joong-Hong Park, Seoul (KR); Sung-Chan Choi, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 12/839,535

(22) Filed: Jul. 20, 2010

(65) Prior Publication Data

US 2011/0085615 A1  Apr. 14, 2011

(30) Foreign Application Priority Data

Oct. 14, 2009  (KR) .................. 10-2009-0097505

(51) Int. Cl.
*H04B 1/38* (2006.01)
*H04L 5/16* (2006.01)

(52) U.S. Cl. ........ 375/220; 375/219; 375/259; 375/211; 375/295; 375/316; 370/347; 370/310; 455/424; 455/425; 455/422.1; 455/41.2; 455/41.1

(58) Field of Classification Search .................. 375/220, 375/219, 259, 211, 295, 316; 370/347, 310; 455/424, 425, 422.1, 41.1, 41.2
See application file for complete search history.

(56) References Cited

U.S. PATENT DOCUMENTS

| | | | |
|---|---|---|---|
| 8,014,325 B2 * | 9/2011 | Izumikawa et al. | 370/310 |
| 2002/0141375 A1 * | 10/2002 | Choi | 370/347 |

FOREIGN PATENT DOCUMENTS

| | | |
|---|---|---|
| JP | 2003-333079 | 11/2003 |
| KR | 10-2005-0090923 | 9/2005 |
| KR | 10-2006-0109027 | 10/2006 |
| KR | 10-2008-0024582 | 3/2008 |
| KR | 10-2009-0001095 | 1/2009 |
| KR | 10-2009-0005290 | 1/2009 |
| WO | WO 2007/097877 | 8/2007 |
| WO | WO 2008/048789 | 4/2008 |

* cited by examiner

*Primary Examiner* — Phuong Phu
(74) *Attorney, Agent, or Firm* — NSIP Law

(57) ABSTRACT

A data transmission apparatus and a data apparatus, are provided. The apparatuses may share data in a Peer-to-Peer (P2P) scheme via a network. The data transmission apparatus divides data into a plurality of segments, and determines a transmission order with respect to each of the divided segments. The data transmission apparatus and the data apparatus share data based on the transmission order of the divided segments.

17 Claims, 8 Drawing Sheets

| INDEX OF RECEPTION APPARATUS | | | | | | | | |
|---|---|---|---|---|---|---|---|---|
| 1 | | | 2 | | | 4 | | |
| SEGMENT | | | | | | | | |
| 1 | 2 | 3 | 1 | 2 | 3 | 1 | 2 | 3 |
| $t_1$ (411) | $t_1$ (413) | $t_1$ (412) | | $t_2$ (422) | $t_2$ (423) | $t_2$ (421) | | $t_3$ (431) | | $t_2$ (424) | $t_3$ (432) |
| INDEX OF TRANSMISSION APPARATUS | | | | | | | | |
| 3 | | | 1 | | | 1 | 2 | 2 |

SYSTEM OF SHARING DATA USING TRANSMISSION ORDER

CROSS-REFERENCE TO RELATED APPLICATION(S)

This application claims the benefit under 35 U.S.C. §119 (a) of Korean Patent Application No. 10-2009-0097505, filed on Oct. 14, 2009, in the Korean Intellectual Property Office, the entire disclosure of which is incorporated herein by reference for all purposes.

BACKGROUND

1. Field

The following description relates to a technique for sharing data using a network, and more particularly, to a technique for dividing data into a plurality of segments and determining a transmission order with respect to each of the divided segments.

2. Description of Related Art

The Internet may be an open network that adopts a common communication protocol such as a Transmission Control Protocol/Internet Protocol (TCP/IP) and the like, and may provide a variety of services such as information retrieval, electronic mail (e-mail), file transfer, and the like. In particular, with an increase in a speed of the Internet, sales and distribution of a variety of data sources such as multi-media contents and the like may become possible.

To logically share resources dispersed among several nodes, such as a system, a network, and the like, a Peer-to-Peer (P2P) scheme may be used. The P2P scheme may be used to enable communication between respective nodes to directly share data without relying on a specific server. This scheme may significantly reduce additional costs generated when operating an existing server-client model. In the P2P model, a single node may arbitrarily configure a plurality of data sessions with peer nodes of the other party when sharing data between the respective nodes, thereby providing an increased data transmission rate and an improved performance.

A P2P scheme may be used for sharing data among a plurality of devices. The P2P scheme may provide an efficient performance when a plurality of peers share the same data in an Internet environment. That is, when the plurality of peers share the same data or when the plurality of peers simultaneously download the same file, efficiency of data transmission may be increased.

SUMMARY

In one general aspect, there is provided a data transmission apparatus including a data division unit to divide transmission data into a plurality of segments, a transmission order determining unit to determine a transmission order in which to transmit each of the plurality of segments to a plurality of data reception apparatuses, and a data transmission unit to transmit the transmission order to the plurality of data reception apparatuses, and to transmit each of the plurality of segments to the respective plurality of data reception apparatuses based on the transmission order, wherein the transmitted segments are mutually exchanged by each of the plurality of data reception apparatuses.

The transmission order may include information about a time when the data transmission apparatus or each of the plurality of data reception apparatuses transmits each of the plurality of segments and information about each of the plurality of data reception apparatuses receiving each of the plurality of segments.

The transmission order determining unit may determine the transmission order based on at least one of a bandwidth and a power supply type for each of the plurality of data reception apparatuses.

The data transmission apparatus may further include a receiving unit to receive a transmission verification message about the transmitted segments from a first data reception apparatus included in the plurality of data reception apparatuses, wherein, when the receiving unit fails to receive the transmission verification message, the data transmission unit transmits the segments to a second data reception apparatus that was supposed to receive the segments from the first data reception apparatus, based on the transmission order.

In another aspect, there is provided a data reception apparatus including a transmission order receiving unit to receive, from a data transmission apparatus, a transmission order about transmission data including a first segment and a second segment, and a data receiving unit to receive the first segment from the data transmission apparatus, based on the transmission order, and to receive the second segment from the data transmission apparatus via a data sharing apparatus, based on the transmission order.

The data reception apparatus may further include a data transmission unit to transmit the first segment to the data sharing apparatus based on the transmission order.

The data reception apparatus may further include a reception data generating unit to generate reception data by combining the first segment and the second segment.

The transmission order may include information about a time when the data transmission apparatus or the data sharing apparatus transmits each of the first and second segments.

The transmission order may be determined by the data transmission apparatus based on at least one of a bandwidth and a power supply type for each of the data reception apparatus and the data sharing apparatus.

In another aspect, there is provided a data transmission method including dividing transmission data into a plurality of segments, determining a transmission order in which to transmit each of the plurality of segments to a plurality of data reception apparatuses, and transmitting the transmission order to each of the plurality of data reception apparatuses, wherein each of the plurality of segments are mutually exchanged by each of the plurality of data reception apparatuses.

The transmission order may include information about a time when each of the plurality of data reception apparatuses transmits each of the plurality of segments, and information about each of the plurality of data reception apparatuses receiving each of the plurality of segments.

The determining of the transmission order may determine the transmission order based on at least one of a bandwidth and a power supply type for the plurality of data reception apparatuses.

The data transmission method may further include receiving a transmission verification message about the transmitted segments from a first data reception apparatus included in the plurality of data reception apparatuses, and in response to failing to receive the transmission verification message, transmitting the segments to a second data reception apparatus that was supposed to receive the segments from the first data reception apparatus.

In another aspect, there is provided a computer-readable storage medium storing a program to cause a processor to implement a data transmission method, the method including dividing transmission data into a plurality of segments, determining a transmission order in which to transmit each of the plurality of segments to a plurality of data reception apparatuses, and transmitting the transmission order to each of the plurality of data reception apparatuses, wherein each of the plurality of segments are mutually exchanged by each of the plurality of data reception apparatuses.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
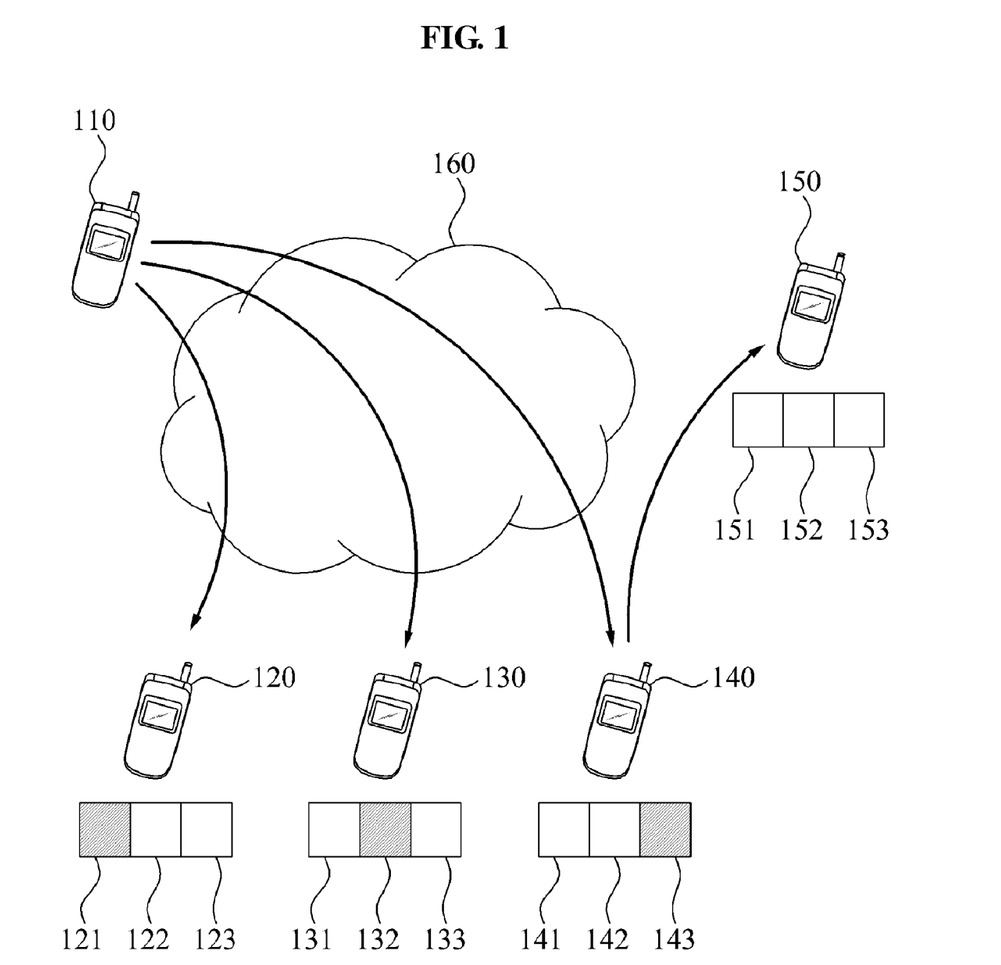
FIG. 1 is a diagram illustrating an example of sharing data.

FIG. 1 illustrates an example of sharing data.

Referring to FIG. 1, data transmission apparatus 110 may divide transmission data into a plurality of segments, or transmit each of the plurality of segments to data reception apparatuses 120, 130, 140, and 150, using a network 160. Each of the data reception apparatuses 120, 130, 140, and 150 may directly receive one or more of the plurality of segments from the data transmission apparatus 110. Also, the data reception apparatus 120, 130, 140, and/or 150 may receive one or more of the segments from other data reception apparatuses 120, 130, 140, and/or 150. That is, the data reception apparatuses 120, 130, 140, and 150 may mutually exchange the plurality of segments amongst themselves. Thus, a data reception apparatus does not need to receive the data directly from the data transmission apparatus.

As illustrated in FIG. 1, the data transmission apparatus 110 may divide the transmission data into one or more segments, for example, three segments. The data transmission apparatus 110 may transmit a first segment to a first data reception apparatus 120, a second segment to a second data reception apparatus 130, and a third segment to a third data reception apparatus 140.

In this example, data segments received by the respective data reception apparatuses 120, 130, 140, and 150 are illustrated by shaded regions. The first data reception apparatus 120 receives a first segment 121, however, does not receive a second segment 122 or a third segment 123. The second data reception apparatus 130 receives only a second segment 132, and does not receive a first segment 131 or a third segment 133. The third data reception apparatus 140 receives only a third segment 143 and does not receive a first segment 141 or a second segment 142. The fourth data reception apparatus 150 does not receive any of segments 151, 152, and 153.

The data reception apparatuses 120, 130, and 140 may transmit the respective segments received by data reception apparatuses 120, 130, and 140, to the remaining data reception apparatuses. Each of the data reception apparatuses 120, 130, 140, and 150 may receive the plurality of segments from the remaining data reception apparatuses 120, 130, and 140. Accordingly, an excessive transmission load with respect to the data transmission apparatus 110 may be reduced. In addition, because the plurality of segments are simultaneously received from a plurality of transmission apparatuses, data may be more effectively shared in an example where downstream/upstream data transmission rates of the data reception apparatuses are different from each other.

For example, the second data reception apparatus 130 receives a first segment from the first data reception apparatus 120. When all of the data reception apparatuses 120, 130, 140, and 150 receive data from the data transmission apparatus 110, a transmission load in the data transmission apparatus 110 may be increased. Accordingly, to effectively share data, each of the data reception apparatuses 120, 130, 140, and 150 may consider information about segments received by the other respective data reception apparatuses 120, 130, 140, and 150, in a specific point in time.

For example, each of the data reception apparatuses 120, 130, 140, and 150 may consider a transmission order with respect to each of the plurality of segments. In this example, the first data reception apparatus 120 receives a first segment from the data transmission apparatus 110 in a first time duration, and the second data reception apparatus 130 receives the first segment from the first data reception apparatus 120 in a second time duration.

For example, the data transmission apparatus 110 may determine the transmission order with respect to each of the plurality of segments, and transmit the determined transmission order to each of the data reception apparatuses 120, 130, 140, and 150. The data transmission apparatus 110 and the data reception apparatuses 120, 130, 140, and 150 may effectively share each of the plurality of segments based on the transmission order. In addition, the data reception apparatuses 120, 130, 140, and 150 may omit a supplementary message for information about each of the plurality of segments.

Figure 2:
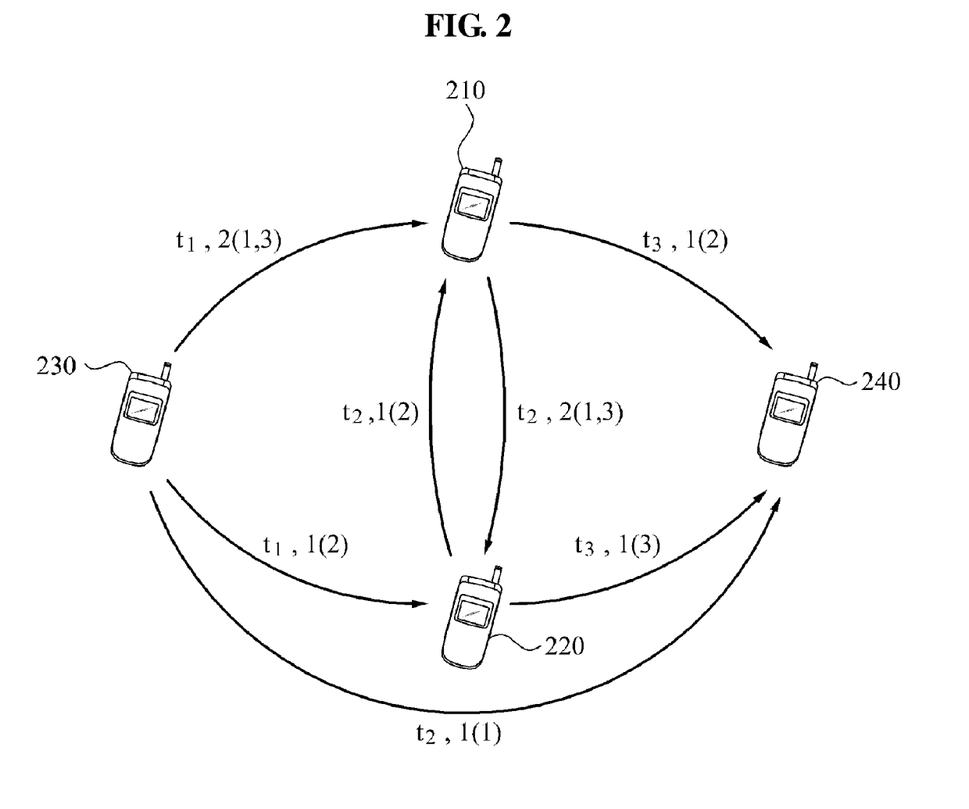
FIG. 2 is a diagram illustrating another example of sharing data.

FIG. 2 illustrates another example of sharing data.

As illustrated in FIG. 2, respective terminals 210, 220, 230, and 240 may act as a data transmission apparatus, or act as a data reception apparatus. That is, one or more terminals may act as the data reception apparatus in a time duration receiving segments from the data transmission apparatus. In addition, one or more terminals may act as the data transmission apparatus in a time duration transmitting the received segments to other terminals. In some embodiments, respective terminals are not named as either a data transmission apparatus or a data reception apparatus, but instead are merely named as a terminal.

Referring to FIG. 2, in this example a third terminal 230 initially includes all of shared data stored therein, and transmits the shared data to the a first terminal 210, a second terminal 220, and a fourth terminal 240, using a network.

Arrows of FIG. 2 indicate a transmission direction of each segment, and characters near the arrows indicate a transmission order in which each segment is transmitted. For example, t1, 2(1,3) denotes the transmitting of a first segment and a third segment in a first time duration. Also, the numeral on the outside of the parentheses denotes the number of transmitted segments. Accordingly, two segments, the first segment and the third segment, are transmitted during the first time duration.

In this example, the third terminal 230 transmits the first segment and third segment to the first terminal 210, during the first time duration (t1). Also, the third terminal 230 transmits a second segment to the second terminal 220, during the first time duration (t1). When the first time duration (t1) is terminated, the first terminal 210 has completely received the first segment and the third segment, and the second terminal 220 has completely received the second segment.

In this example, the first terminal 210 transmits the first segment and the third segment to the second terminal 220, during a second time duration (t2). The second terminal 220 transmits the second segment to the first terminal 210, during the second time duration (t2). Also, the third terminal 230 transmits the first segment to a fourth terminal 240, during the second time duration (t2).

When the second time duration (t2) is terminated, the first terminal 210 and the second terminal 220 have received all segments. Meanwhile, the fourth terminal 240 has only received the first segment.

Accordingly, the other terminals may transmit data segments to the fourth terminal, such that the fourth terminal also receives all of the data segments. For example, the first terminal 210 may transmit the second segment to the fourth terminal 240, during a third time duration (t3). Also, the second terminal 220 may transmit the third segment to the fourth terminal 240, during the third time duration (t3).

When the third time duration (t3) is terminated, all terminals 210, 220, 230, 240 have received all the data segments.

According to various embodiments, the respective terminals 210, 220, 230, and 240 may effectively transmit each of the segments in the respective time durations without duplicately transmitting or re-transmitting the segments. Each of the terminals 210, 220, 230, and 240 may request the remaining terminals 210, 220, 230, and 240 to transmit one or more segments, respectively, based on the transmission order.

The third terminal 230 that initially transmits the transmission data may determine the transmission order with respect to the respective segments constituting the transmission data. The terminals 210, 220, and 240 receiving the transmission data may receive the transmission order from the third terminal 230, and effectively receive the respective segments based on the transmission order.

The third terminal 230 may determine the transmission order with respect to the respective segments based on a bandwidth of the terminals 210, 220, and 240, a transmission load of a network, and the like. The respective transmissions of the segments may be simultaneously performed, thus, data sharing may be carried out more quickly.

Figure 3:
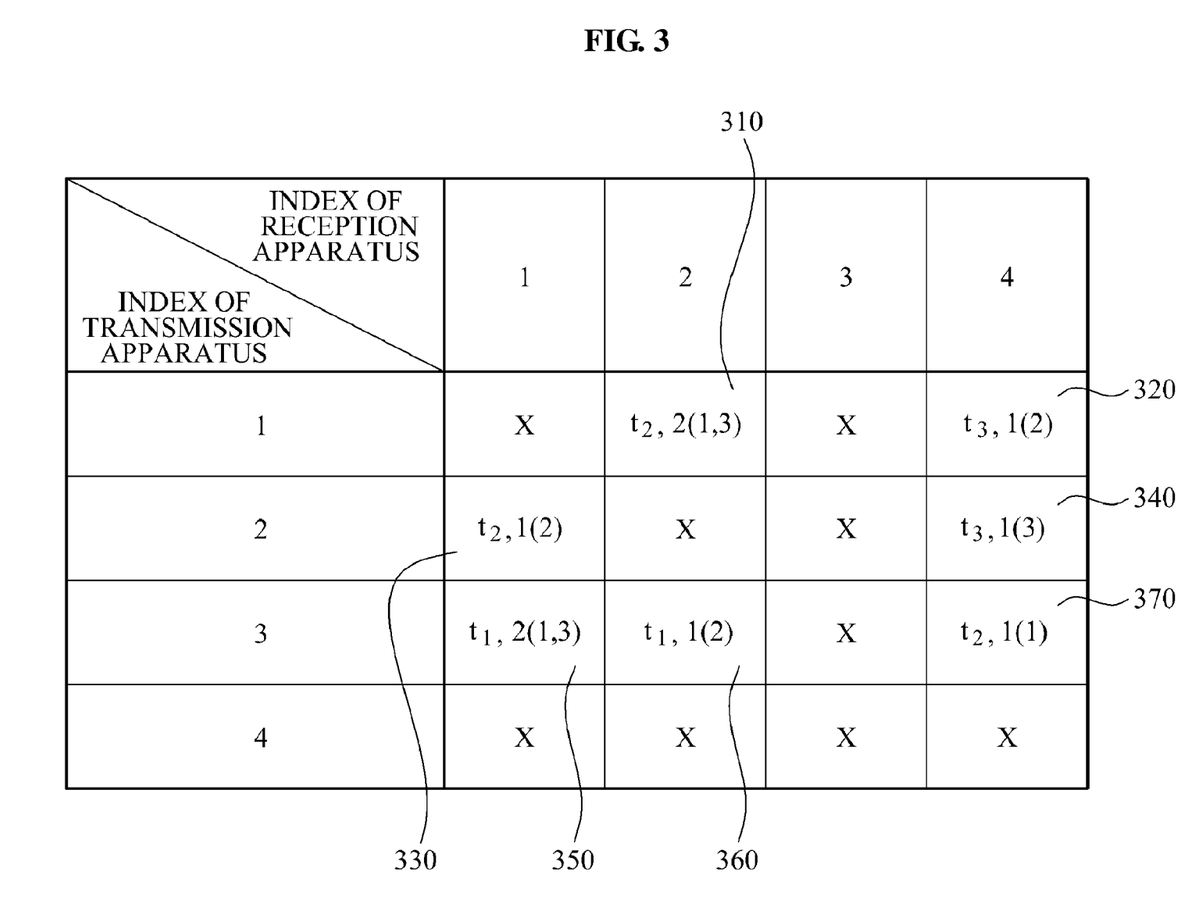
FIG. 3 is a diagram illustrating an example of a transmission order matrix.

FIG. 3 illustrates an example of a transmission order matrix. In this example, the transmission order of FIG. 3 is the same as that of FIG. 2.

In FIG. 3, a row of the matrix may indicate an index of a data reception apparatus, and a column of the matrix may indicate an index of a data transmission apparatus. For example, the data transmission apparatus having an index of '1' and the data reception apparatus having an index of '2' may indicate information about a segment transmitted from a first terminal to a second terminal.

Diagonal elements of the matrix of FIG. 3 may indicate that an arbitrary terminal transmits the segment to itself. This scheme may be used to indicate that a diagonal element does not have information about the transmission order.

Referring also to FIG. 2, the third terminal 230 initially has the data segments stored therein and transmits the segments to the remaining terminals 210, 220, and 240. Accordingly, the third terminal 230 does not need to receive the segments from the terminals 210, 220, and 240, and the data reception apparatus of an index of "3" in the transmission order illustrated in FIG. 3 may not have information about the transmission order.

Referring to the transmission order of FIG. 3, in operation 350, the third terminal 230 transmits a first segment and a third segment to the first terminal 210, during a first time duration. In operation 360, the third terminal 230 transmits a second segment to the first terminal 210, during the first time duration.

In operation 330, the second terminal 220 transmits the second segment to the first terminal 210, during a second time duration. In operation 310, the first terminal 210 transmits the first segment and the third segment to the second terminal 220, during the second time duration. In operation 370, the third terminal 230 transmits the first segment to the fourth terminal 240, during the second time duration.

In operation 320, the first terminal 210 transmits the second segment to the fourth terminal 240, during a third time duration. In operation 340, the second terminal 220 transmits the third segment to the fourth terminal, during the third time duration.

Accordingly, the respective terminals 210, 220, 230, and 240 may effectively transmit the segments constituting the transmission data, based on the transmission order of FIG. 3.

In the example shown in FIG. 3, the transmission order is generated by a point in time when the respective terminals 210, 220, 230, and 240 transmit each of the segments. However, the transmission order may be generated by the respective segments.

Figure 4:
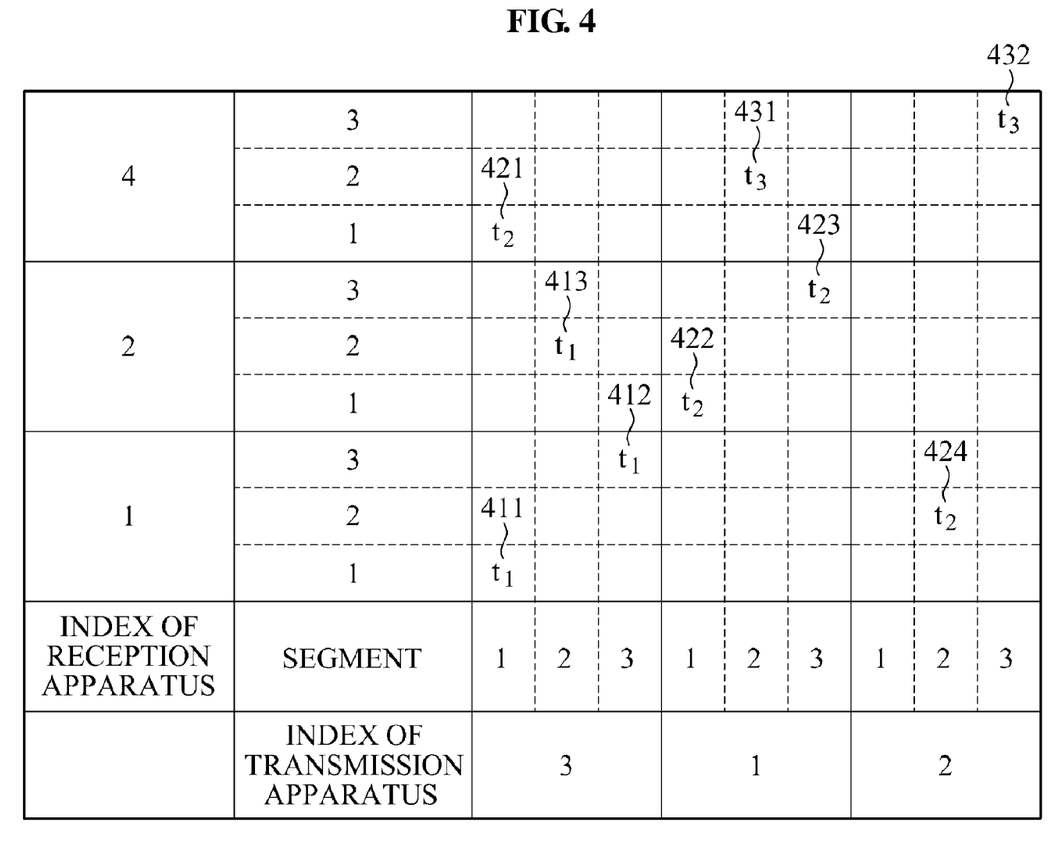
FIG. 4 is a diagram illustrating another example of a transmission order matrix.

FIG. 4 illustrates another example of a transmission order matrix. In this example, the transmission order of the FIG. 4 is the same as those of FIGS. 2 and 3.

A column of a matrix of FIG. 4 indicates an index of a data reception apparatus and an index of a segment received by each data reception apparatus. Also, a row of the matrix indicates an index of a data transmission apparatus and an index of a segment transmitted by each data transmission apparatus.

Referring to FIG. 2 and the matrix of FIG. 4, in operation 411, the third terminal 230 transmits a first segment to the first terminal 210, during a first time duration (t1). In operation 412, the third terminal 230 transmits a third segment to the first terminal 210, during the first time duration (t1). In operation 413, the third terminal 230 transmits the second segment to the second terminal 220, during the first time duration (t1).

In operation 422, the first terminal 210 transmits the first segment to the second terminal 220, during a second time duration (t2). In operation 423, the first terminal 210 transmits the third segment to the second terminal 220, during the second time duration (t2). In operation 424, the second terminal 220 transmits the second segment to the first terminal 210, during the second time duration (t2). In operation 421, the third terminal 430 transmits the first segment to the fourth terminal 240, during the second time duration (t2).

In operation 431, the first terminal 210 transmits the second segment to the fourth terminal 240, during a third time duration (t3), and in operation 432, the second terminal 220 transmits the third segment to the fourth terminal 240, during the third time duration (t3).

The transmission order of FIG. 3 or 4 may include information about which terminal transmits which segment to which terminal in which time duration. Accordingly, when the respective terminals 210, 220, 230, and 240 transmit/receive each segment in accordance with the transmission order, data sharing may be effectively carried out.

Figure 5:
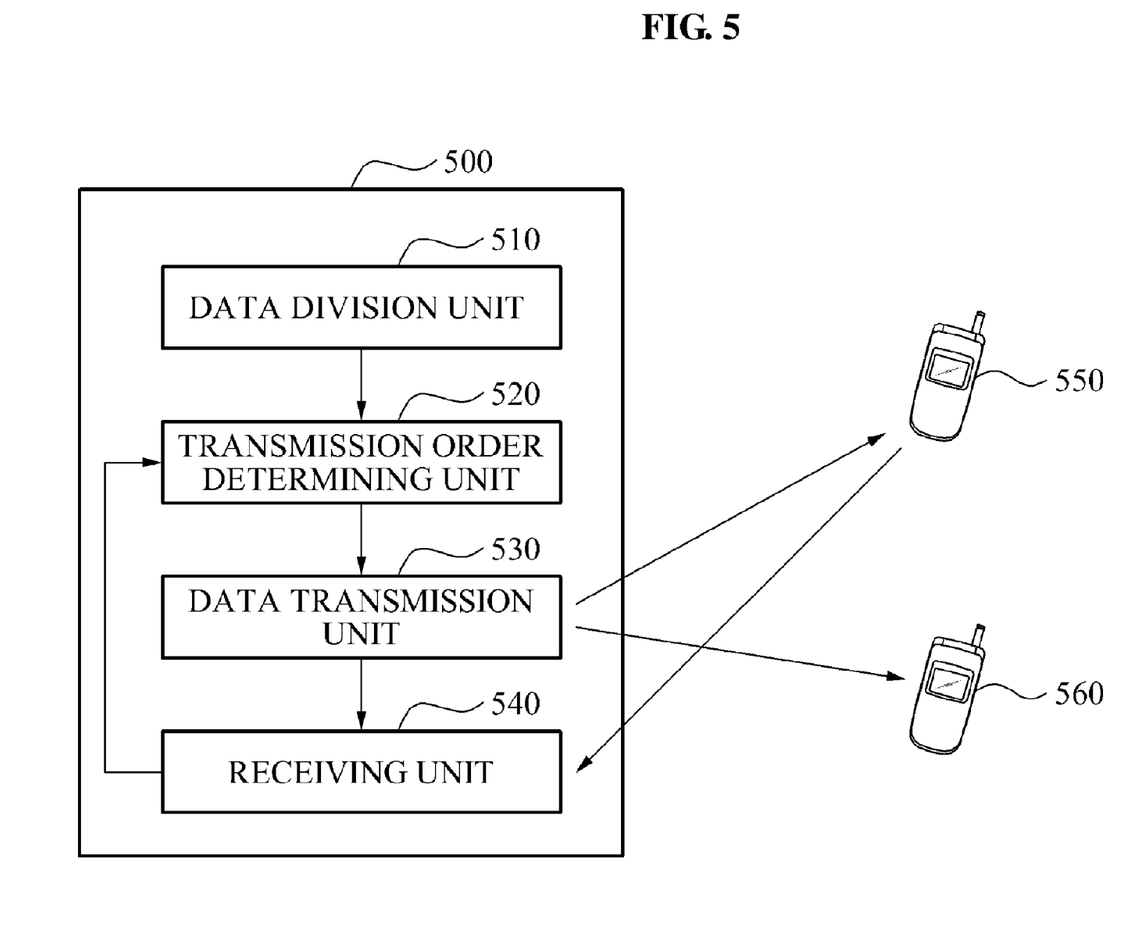
FIG. 5 is a diagram illustrating an example of a data transmission apparatus.

FIG. 5 illustrates an example of a data transmission apparatus. Referring to FIG. 5, data transmission apparatus 500 includes a data division unit 510, a transmission order determining unit 520, a data transmission unit 530, and a receiving unit 540.

The data division unit 510 may divide transmission data into a plurality of segments including at least a first segment and a second segment.

The transmission order determining unit 520 may determine a transmission order for transmitting each of the plurality of segments to a first data reception apparatus 550 and a second data reception apparatus 560. For example, the transmission order may include information about a time when the data transmission apparatus 500 and/or each of the first and second data reception apparatuses 550 and 560 transmits the plurality of segments. In some embodiments, the transmission order may include information about the data transmission apparatus transmitting each of the plurality of segments or information about the data reception apparatus receiving each of the plurality of segments.

The respective terminals 500, 550, and 560 may act as the data transmission apparatus or the data reception apparatus, as desired. In this example, the transmission order may include an identifier (ID) of the terminal transmitting each of the plurality of segments and an ID of the terminal receiving each of the plurality of segments.

The transmission order determining unit 520 may determine the transmission order based on at least one of a bandwidth and a power supply of the respective data reception apparatuses 550 and 560. For example, when the bandwidth of the data reception apparatus 550 is relatively narrow, the data reception apparatus 550 may not be suitable to transmit received segments to another data reception apparatus 560. Accordingly, the transmission order determining unit 520 may determine the transmission order with respect to each of the plurality of segments, such that the number of times the data reception apparatus 550 transmits segments to another data reception apparatus 560 is reduced.

Accordingly, the transmission order determining unit 520 may determine the transmission order based on a power supply type for the respective data reception apparatuses.

For example, a battery may be a power supply means where a certain amount of power is stored, and may be an unstable power supply means that may no longer supply a power because the data reception apparatus 560 completely consumes the given power.

However, a power supply network may supply power generated in a plant, and may be a stable power supply system that is capable of continuously supplying power. The power supply type, as described herein, may indicate information about whether the respective reception apparatuses 550 and 560 are receiving power from an unstable power supply system or from a stable power supply system.

Transmission of the segments may consume greater power in comparison with reception of the segments. Accordingly, when the data reception apparatus 550 is supplied with a power from the battery, and the data reception apparatus 560 is supplied with a power from the power supply network, the transmission order determining unit 520 may determine that the data reception apparatus 560 is more suitable for transmitting the segments. In this example, the transmission order determining unit 520 may determine the transmission order with respect to each of the plurality of the segments, such that the number of times the data reception apparatus 550 transmits the segments to another data reception apparatus 560 is reduced.

The data transmission unit 530 may transmit the transmission order to the first data reception apparatus 550 and the second data reception apparatus 560. For example, the transmission order determining unit 520 may determine the transmission order in the matrix type illustrated in FIG. 3 or 4, and the data transmission unit 340 may transmit, to the respective data reception apparatuses 550 and 560, only the transmission order corresponding to a specific column or a specific row from the matrix-typed transmission orders.

The receiving unit 540 may receive a transmission verification message with respect to the transmission order from the first data reception apparatus 550 and/or the second data reception apparatus 560. When the receiving unit 540 fails to receive the transmission verification message, the data transmission apparatus 500 may determine that the first data reception apparatus 550 fails to receive the data.

When the receiving unit 540 receives the transmission verification message, the data transmission apparatus 530 may transmit the first segment to the first data reception apparatus 550, based on the transmission order, and transmit the second segment to the second data reception apparatus 560, based on the transmission order.

The receiving unit 540 may receive the transmission verification message with respect to the first segment from the first data reception apparatus 550. When the receiving unit 540 fails to receive the transmission verification message with respect to the first segment, the data transmission apparatus 500 may determine that the first segment is not successively transmitted to the first data reception apparatus 550.

When the first segment is successively transmitted to the first data reception apparatus 550, the second data reception apparatus 560 may receive the first segment from the first data reception apparatus 550, based on the transmission order.

When failing to transmit the first segment to the first data reception apparatus 550 in the first time duration, the second data reception apparatus 560 may fail to receive the first segment from the first data reception apparatus 550. Thereafter, other data reception apparatuses receiving the first segment from the first data reception apparatus 550 or the second data reception apparatus 560, may also fail to continuously receive the first segment.

Accordingly, when the receiving unit 540 fails to receive the transmission verification message with respect to the first segment, the data transmission unit 530 may transmit the first segment to the second data reception apparatus 560. In other words, the data transmission unit 530 may act as the first data reception apparatus 550.

In some embodiments, when the receiving unit 540 fails to receive the transmission verification message with respect to the first segment, the transmission order determining unit 520 may update the transmission order with respect to the first segment. For example, the transmission order determining unit 520 may update the transmission order with respect to the first segment, such that the data transmission unit 530 re-transmits the first segment to the first data reception apparatus 550, during the second time duration, and the first data reception apparatus 550 transmits the first segment to the second data reception apparatus 560, during the third time duration.

The data transmission unit 530 may transmit the updated transmission order to the first data reception apparatus 550 and the second data reception apparatus 560. The data transmission unit 530 may re-transmit the first segment to the first data reception apparatus 550, during the second time duration, based on the updated transmission order. Also, the data reception apparatus 560 may receive the first segment from the first data reception apparatus 550, during the third time duration, based on the updated transmission order.

Figure 6:
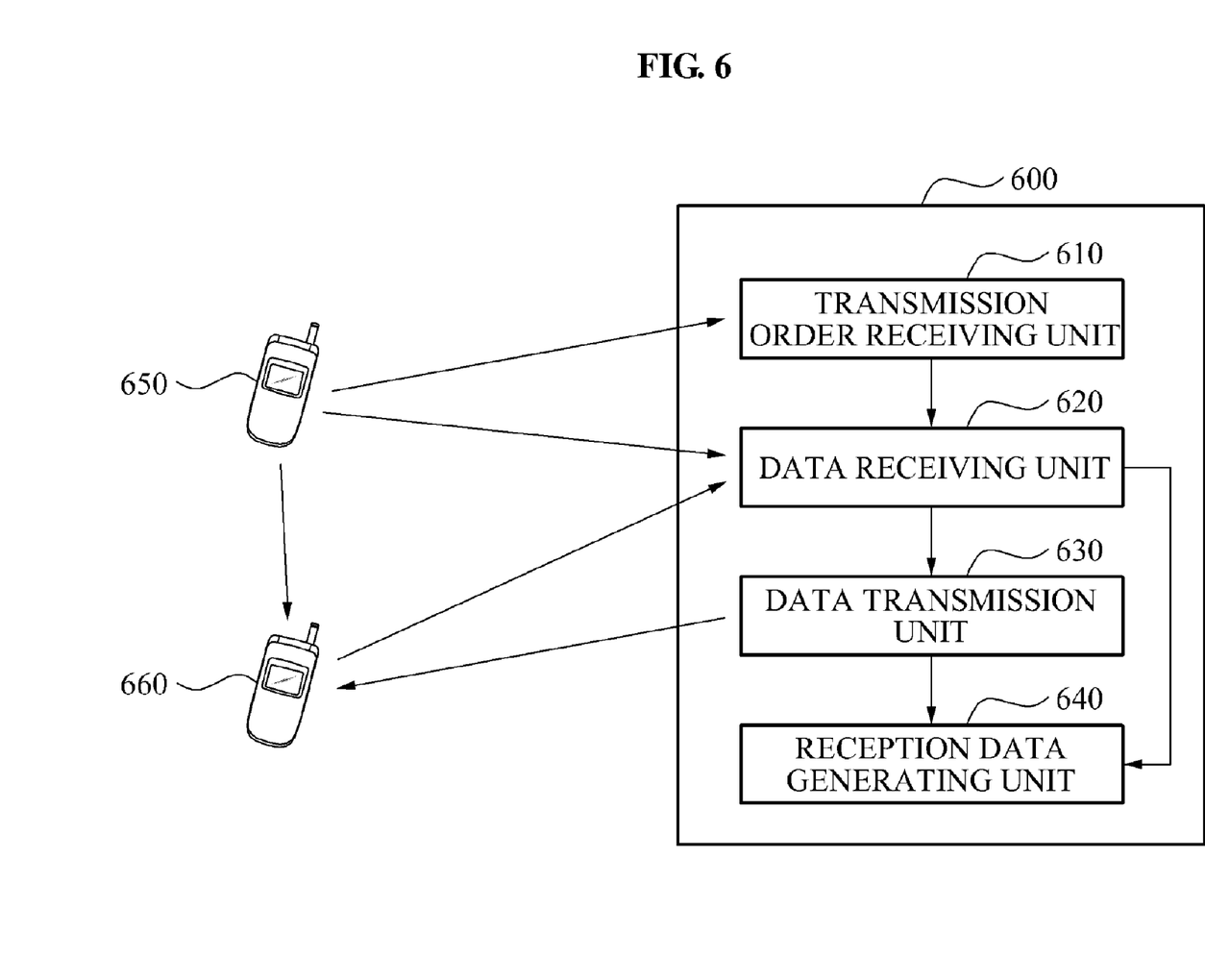
FIG. 6 is a diagram illustrating an example of a data reception apparatus.

FIG. 6 illustrates another example of a data reception apparatus. Referring to the example shown in FIG. 6, data reception apparatus 600 includes a transmission order receiving unit 610, a data receiving unit 620, a data transmission unit 630, and a receiving data generation unit 640.

A data transmission apparatus 650 may divide transmission data into a plurality of segments including at least a first segment and a second segment. Also, the data transmission apparatus 650 may determine a transmission order. For example, the data transmission apparatus 650 may determine the transmission order with respect to each of the plurality of segments based on at least one of a bandwidth, a power supply type, and data processing property with respect to the data reception apparatus 600 and a data sharing apparatus 660.

The transmission order receiving unit 610 may receive the transmission order with respect to the first segment and the second segment, from the data transmission apparatus 650. For example, the transmission order may include information about a time when the data transmission apparatus 650, the data sharing apparatus 660, and the data reception apparatus 600, transmit each of the plurality of segments.

The data receiving unit 620 may receive the first segment from the data transmission apparatus 650, based on the transmission order. The data transmission apparatus 650 may transmit the second segment to the data sharing apparatus 660, based on the transmission order. The data receiving unit 620 may receive the second segment from the data sharing apparatus 660, based on the transmission order.

The data transmission unit 630 may transmit the first segment to the data sharing apparatus 660, based on the transmission order.

The receiving data generation unit 640 may generate reception data by combining the first segment and the second segment. The reception data generated by the receiving data generation unit 640 may be data obtained by restoring the transmission data transmitted by the data transmission apparatus 650.

Figure 7:
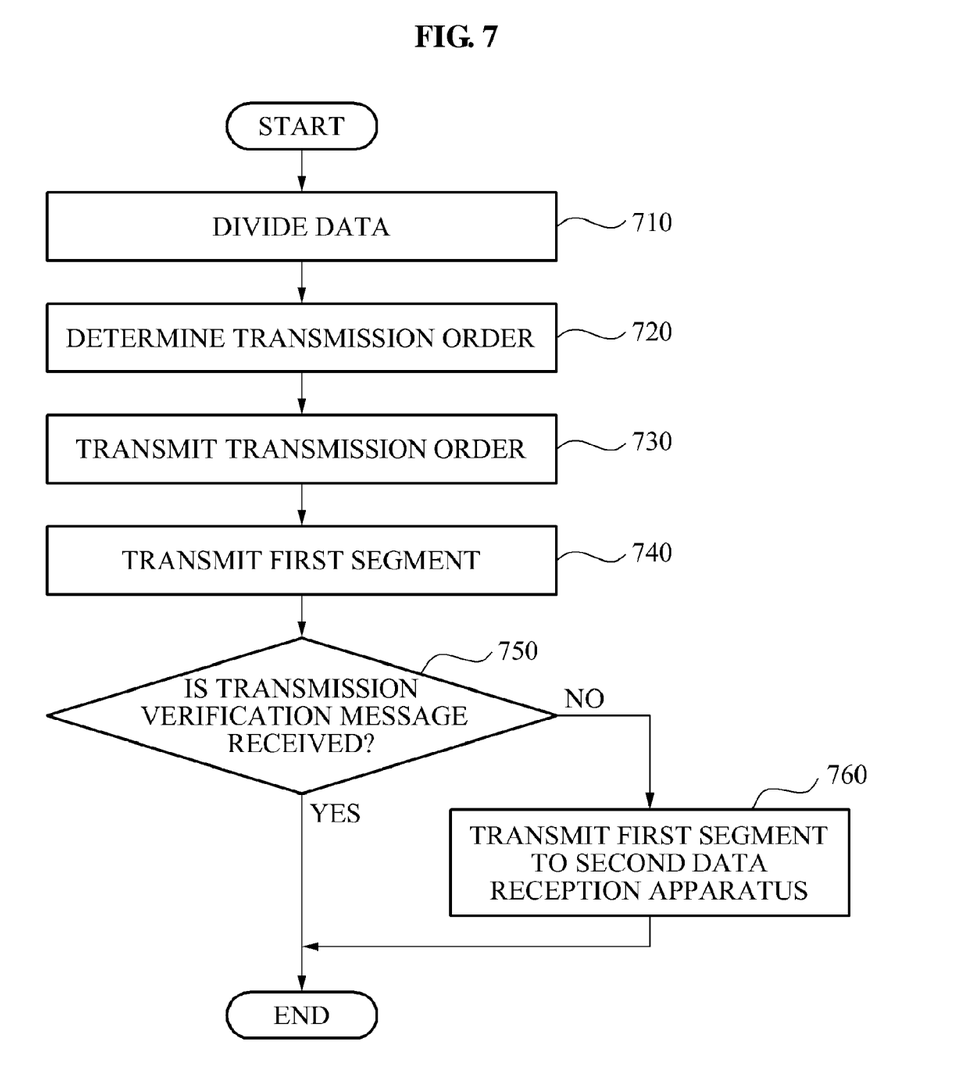
FIG. 7 is a flowchart illustrating an example of a data transmission method.

FIG. 7 illustrates an example of a data transmission method.

In operation 710, a data transmission apparatus may divide transmission data into a plurality of segments including at least a first segment and a second segment.

In operation 720, the data transmission apparatus may determine a transmission order with respect to each of the plurality of segments. For example, the transmission order may include information about a time when the data transmission apparatus or a data reception apparatus transmits each of the plurality of segments, and information about the data reception apparatus receiving each of the plurality of segments.

The transmission order may include, for example, information about a transmission point in time with respect to each of the plurality of segments, the data transmission apparatus, and the data reception apparatus.

In operation 720, the data transmission apparatus may determine the transmission order based on at least one of a bandwidth, a power supply type, and data processing properties with respect to each data reception apparatus.

In operation 730, the data transmission apparatus may transmit the first segment to a first data reception apparatus, during a first time duration, based on the transmission order. Also, the data transmission apparatus may transmit the second segment to a second data reception apparatus, based on the transmission order.

In operation 750, the data transmission apparatus may receive a transmission verification message with respect to the first segment, from the first data reception apparatus.

When receiving the transmission verification message with respect to the first segment, the data transmission apparatus may determine the transmission of the first segment was successfully performed. When the transmission with respect to the first segment is successfully performed, the first data reception apparatus may transmit the first segment to the second data reception apparatus, based on the transmission order.

When failing to receive the transmission verification message in operation 750, the data transmission apparatus may determine that the first data reception apparatus fails to receive the first segment. Due to the transmission order, when the first segment is transmitted from the first data reception apparatus to the second data reception apparatus, the second data reception apparatus may also fail to receive the first segment.

Therefore, in operation 760, the data transmission apparatus may transmit the first segment to the second data reception apparatus. Even though the first segment fails to be transmitted to the first data reception apparatus, the first segment may be successfully transmitted to the second data reception apparatus.

Figure 8:
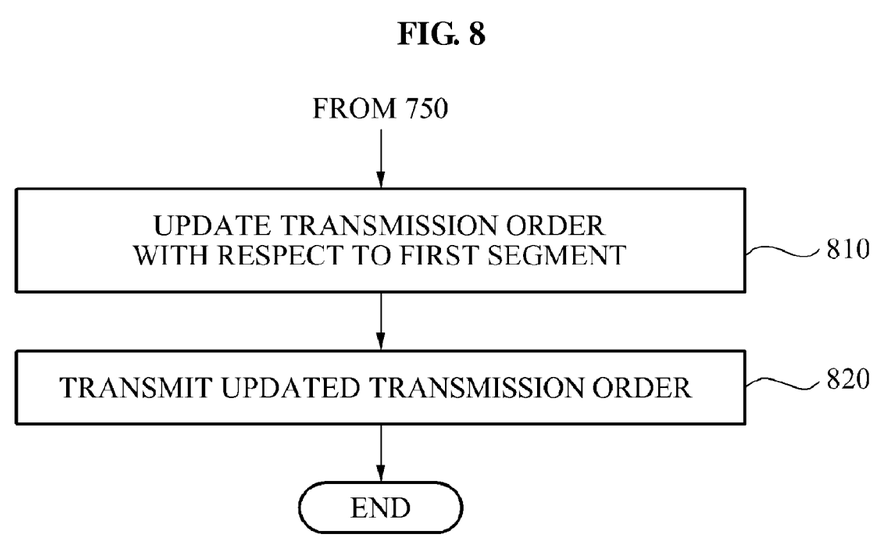
FIG. 8 is a flowchart illustrating another example of a data transmission method.

FIG. 8 illustrates another example of a data transmission method.

In this example, it is assumed that the data transmission apparatus fails to receive the transmission verification message in operation 750 of FIG. 7.

In operation 810, the data transmission apparatus may update the transmission order with respect to the first segment. For example, the data transmission apparatus may update the transmission order, such that the data transmission apparatus re-transmits the first segment to the first data reception apparatus, during the second time duration, and the first data reception apparatus transmits the first segment to the second data reception apparatus, during the third time duration.

In operation 820, the data transmission apparatus may transmit the updated transmission order to the first data reception apparatus and the second data reception apparatus.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or to program instructions may be stored and executed in a decentralized manner.

As a non-exhaustive illustration only, the data transmission apparatus and/or the data reception apparatus described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data transmission apparatus, comprising:
   a data division unit configured to divide transmission data into a plurality of segments;
   a transmission order determining unit configured to determine a transmission order in which a plurality of data sharing apparatuses are to transmit the plurality of segments between the plurality of data sharing apparatuses such that each data sharing apparatus receives the plurality of data segments; and
   a data transmission unit configured to:
      transmit the transmission order to the plurality of data sharing apparatuses; and
      transmit the plurality of segments to one or more of the respective plurality of data sharing apparatuses based on the transmission order,
   wherein the transmitted segments are mutually exchanged by the plurality of data sharing apparatuses.

2. The data transmission apparatus of claim 1, wherein the transmission order comprises:
   information about a time when the data transmission apparatus and the plurality of data sharing apparatuses transmit the plurality of segments; and
   information about each of the plurality of data sharing apparatuses receiving each of the plurality of segments.

3. The data transmission apparatus of claim 1, wherein the transmission order determining unit is further configured to determine the transmission order based on at least one of a bandwidth and a power supply type for the plurality of data sharing apparatuses.

4. The data transmission apparatus of claim 1, further comprising:
   a receiving unit configured to receive a transmission verification message about the transmitted segments from a first data sharing apparatus included in the plurality of data sharing apparatuses,
   wherein, in response to the receiving unit failing to receive the transmission verification message, the data transmission unit is further configured to transmit the segments to a second data sharing apparatus that was supposed to receive the segments from the first data sharing apparatus, based on the transmission order.

5. A data sharing apparatus comprising:
   a transmission order receiving unit configured to receive, from a data transmission apparatus, a transmission order about transmission data comprising a first segment and a second segment, the transmission order comprising an order in which a plurality of data sharing apparatuses are to transmit the first segment and the second segment between the plurality of data sharing apparatuses such that each data sharing apparatus receives each of the first and second segments; and
   a data receiving unit configured to:
      receive the first segment from the data transmission apparatus, based on the transmission order; and
      receive the second segment from another data sharing apparatus, based on the transmission order.

6. The data sharing apparatus of claim 5, further comprising a data transmission unit configured to transmit the first segment to another data sharing apparatus based on the transmission order.

7. The data sharing apparatus of claim 5, further comprising a reception data generating unit configured to generate data by combining the first segment and the second segment.

8. The data sharing apparatus of claim 5, wherein the transmission order further comprises information about a time when the data transmission apparatus and the data sharing apparatus transmit the first and second segments.

9. The data sharing apparatus of claim 5, wherein the transmission order is determined by the data transmission apparatus based on at least one of a bandwidth and a power supply type for each of the plurality of data sharing apparatuses.

10. A data transmission method, comprising:
    dividing transmission data into a plurality of segments;
    determining a transmission order in which a plurality of data sharing apparatuses are to transmit the plurality of segments between the plurality of data sharing apparatuses such that each data sharing apparatus receives the plurality of data segments; and
    transmitting the transmission order to each of the plurality of data sharing apparatuses,
    wherein the plurality of segments are mutually exchanged by the plurality of data sharing apparatuses.

11. The data transmission method of claim 10, wherein the transmission order comprises:
  information about a time when of the plurality of data sharing apparatuses transmit the plurality of segments; and
  information about each of the plurality of data sharing apparatuses receiving each of the plurality of segments.

12. The data transmission method of claim 10, wherein the determining of the transmission order comprises determining the transmission order based on at least one of a bandwidth and a power supply type for the plurality of data sharing apparatuses.

13. The data transmission method of claim 10, further comprising:
  receiving a transmission verification message about the transmitted segments from a first data sharing apparatus included in the plurality of data sharing apparatuses; and
  in response to failing to receive the transmission verification message, transmitting the segments to a second data sharing apparatus that was supposed to receive the segments from the first data sharing apparatus.

14. A non-transitory computer-readable storage medium storing a program to cause a processor to implement a data transmission method, the method comprising:
  dividing transmission data into a plurality of segments;
  determining a transmission order in which a plurality of data sharing apparatuses are to transmit the plurality of segments between the plurality of data sharing apparatuses such that each data sharing apparatus receives the plurality of data segments; and
  transmitting the transmission order to each of the plurality of data sharing, apparatuses,
  wherein each of the plurality of segments are mutually exchanged by the plurality of data sharing apparatuses.

15. The data transmission apparatus of claim 1, wherein the transmission order comprises an order in which one or more of the plurality of data sharing apparatuses and the data transmission apparatus are to simultaneously transmit the plurality of segments to the plurality of data sharing apparatuses.

16. The data transmission apparatus of claim 1, wherein the transmission order comprises an order such that at least two of the data sharing apparatuses receive data segments from different data sharing apparatuses from among the plurality of data sharing apparatuses.

17. The data sharing apparatus of claim 5, wherein the data receiving unit receives the first segment from the data transmission apparatus and simultaneously receives the second segment from the data sharing apparatus.

\* \* \* \* \*